(12) United States Patent
Pang et al.

(10) Patent No.: US 9,769,063 B2
(45) Date of Patent: *Sep. 19, 2017

(54) WIRELESS MESH NETWORK INCLUDING RESILIENT BACKHAUL LINKS AND WLAN TRAFFIC LOCAL SWITCHING

(71) Applicant: Cisco Technology, Inc., San Jose, CA (US)

(72) Inventors: Tak Ming Pang, Palo Alto, CA (US); Robert C. Meier, Cuyahoga Falls, OH (US); Yanxin Na, Plano, TX (US); Emburey Samrex Edward, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,037

(22) Filed: Jun. 6, 2016

(65) Prior Publication Data

US 2016/0285751 A1    Sep. 29, 2016

Related U.S. Application Data

(63) Continuation of application No. 14/095,406, filed on Dec. 3, 2013, now Pat. No. 9,408,249.

(51) Int. Cl.
*H04L 12/703* (2013.01)
*H04W 84/12* (2009.01)
*H04W 40/24* (2009.01)
*H04L 12/733* (2013.01)
*H04L 12/753* (2013.01)

(52) U.S. Cl.
CPC ............ *H04L 45/28* (2013.01); *H04L 45/122* (2013.01); *H04L 45/48* (2013.01); *H04W 40/24* (2013.01); *H04W 84/12* (2013.01)

(58) Field of Classification Search
CPC ... H04W 84/12; H04W 40/24; H04W 40/242; H04W 40/244; H04W 40/246;H04W 40/248; H04L 45/28; H04L 45/48; H04L 45/122
See application file for complete search history.

(56) References Cited

U.S. PATENT DOCUMENTS

7,496,078 B2    2/2009    Rahman
7,684,355 B2    3/2010    Meier et al.
(Continued)

OTHER PUBLICATIONS

Aruba Networks, Inc., "Outdoor MIMO Wireless Networks," Version 1.0, Validated Reference Design, www.arubanetworks.com/pdf/.../OMWN_VRD_2012-01-04%20(1).pdf, Jan. 4, 2012, Part 1, pp. 1-50.
(Continued)

*Primary Examiner* — Habte Mered
(74) *Attorney, Agent, or Firm* — Edell, Shapiro & Finnan, LLC

(57) ABSTRACT

A wireless mesh network includes mesh access points (mesh APs) and a root access point (RAP) forming a root of a tree of the mesh APs in which the mesh APs are linked back to the RAP through parent-child relationships over wireless backhaul links. A mesh AP provides access to the mesh network via connections to wireless clients in one or more wireless local area networks (WLANs) served by the mesh AP. The mesh AP stores mappings between the one or more WLANs served by the mesh AP and one or more virtual local area networks (VLANs) configured on a wired network and to which the WLANs are assigned. The mesh AP receives mappings between the VLANs configured on the wired network and WLANs served by the mesh AP as known by the RAP. If the stored mappings and the received mappings differ, the mesh AP updates the stored mappings with the received mappings that differ from the stored mappings.

20 Claims, 12 Drawing Sheets

(56) References Cited

U.S. PATENT DOCUMENTS

| | | |
|---|---|---|
| 8,111,684 B2 | 2/2012 | Thubert et al. |
| 8,270,382 B2 | 9/2012 | Cam-Winget et al. |
| 2007/0076730 A1 | 4/2007 | Rahman et al. |
| 2008/0084855 A1 | 4/2008 | Rahman et al. |
| 2008/0112363 A1 | 5/2008 | Rahman et al. |
| 2009/0323631 A1 | 12/2009 | Bajic |

OTHER PUBLICATIONS

Aruba Networks, Inc., "Outdoor MIMO Wireless Networks," Version 1.0, Validated Reference Design, www.arubanetworks.com/pdf/.../OMWN_VRD_2012-01-04%20(1).pdf, Jan. 4, 2012, Part 2, pp. 51-100.

Aruba Networks, Inc., "Outdoor MIMO Wireless Networks," Version 1.0, Validated Reference Design, www.arubanetworks.com/pdf/.../OMWN_VRD_2012-01-04%20(1).pdf, Jan. 4, 2012, Part 3, pp. 101-150.

Aruba Networks, Inc., "Outdoor MIMO Wireless Networks," Version 1.0, Validated Reference Design, www.arubanetworks.com/pdf/.../OMWN_VRD_2012-01-04%20(1).pdf, Jan. 4, 2012, Part 4, pp. 151-202.

Conradi, "Current Status and Overview of the CAPWAP Protocol," http://www.cse.wustl.edu/~jain/cse574-10/ftp/capwap/index.html, Apr. 17, 2010, 19 pages.

US 9,769,063 B2

WIRELESS MESH NETWORK INCLUDING RESILIENT BACKHAUL LINKS AND WLAN TRAFFIC LOCAL SWITCHING

PRIORITY CLAIM

This application is a continuation application of U.S. Non-Provisional application Ser. No. 14/095,406, filed Dec. 3, 2013, the entirety of which is incorporated herein by reference.

TECHNICAL FIELD

The present disclosure relates to wireless mesh networks.

BACKGROUND

A wireless mesh network includes wireless access points (APs) connected to each other through a network of wireless backhaul links. A root AP (RAP) of the mesh network has a wired connection to a wired network and connects with mesh APs (mesh APs) through the backhaul links. A controller connected to the wired network provides central control of the mesh network. The controller connects with each root AP to route data traffic associated with the AP, for example, from wireless clients served by the AP, to and from the wired network. If such connectivity between the APs and the controller is lost, the mesh network dissolves and the data traffic associated with each AP can no longer be routed to and from the wired network.

APs in the mesh network may serve clients in wireless local area network (WLANs). The WLANs may be assigned to virtual local area networks (VLANs) configured on the wired network. When VLANs are added to or deleted from the wired network, and as APs serve new WLANs, the assignments between WLANs and VLANs become outdated and, thus, wireless traffic cannot be routed properly from the WLANs to the VLANs in the wired network. This problem is exacerbated by roaming of APs within the mesh network.

Furthermore, the mesh network may be subdivided into multiple Internet Protocol (IP) subnets. A child AP may roam from a first parent AP to a second parent AP within the same IP subnet or across different IP subnets. Properly accounting for the roaming of an AP across different IP subnets is important to maintain a stable operation of the wireless mesh network.

DESCRIPTION OF EXAMPLE EMBODIMENTS

Overview

Figure 1:
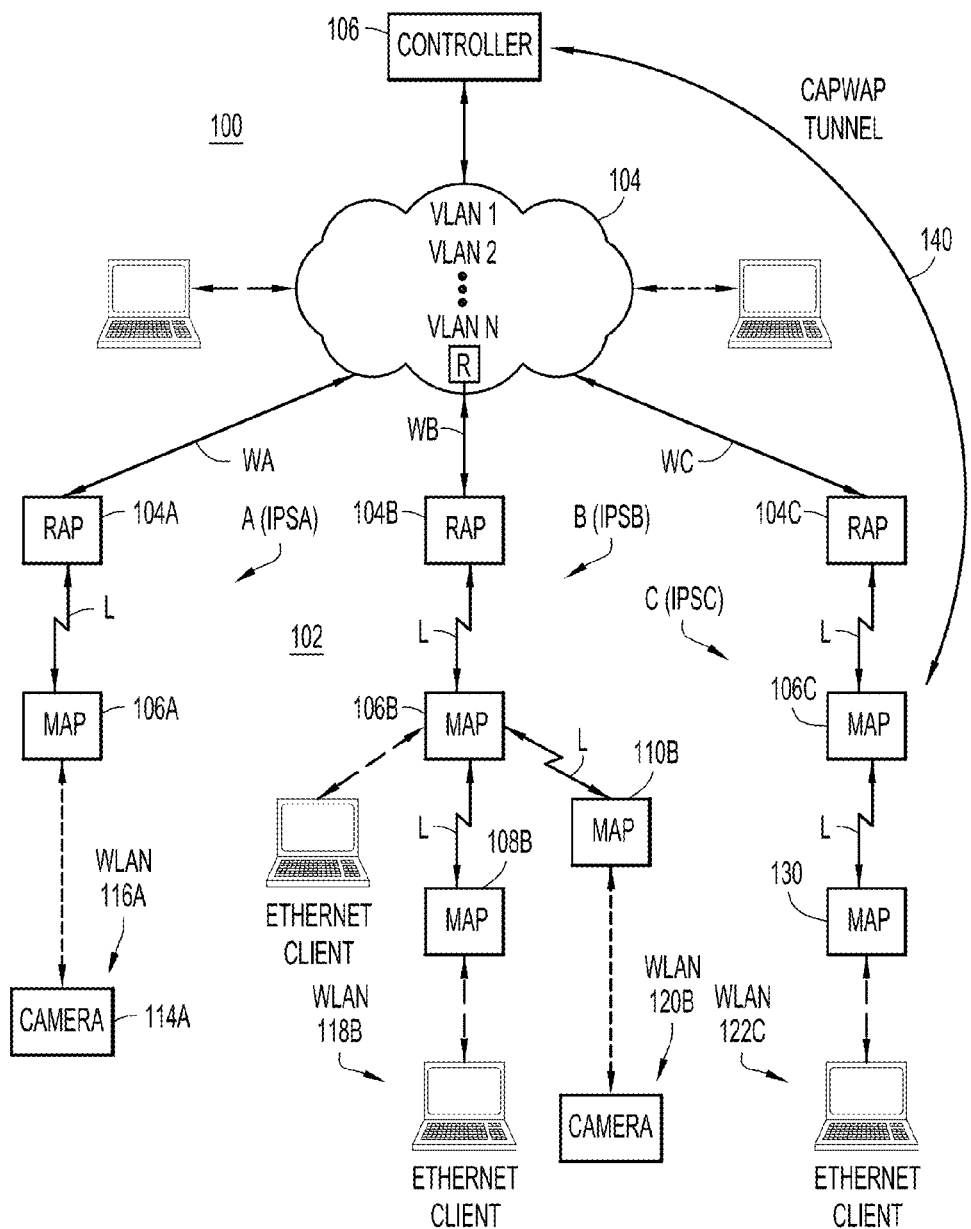
FIG. 1 is a block diagram of an example wireless mesh network to which the techniques presented herein may be employed.

A first technique presented herein operates access points (APs) in a wireless mesh network when connectivity to a controller is lost. The first technique may be performed in an AP in the wireless mesh network. The mesh network includes a plurality of mesh APs and a root AP forming a root of a tree of the mesh APs. The mesh APs are linked back to the root AP through parent-child relationships over wireless backhaul links. The root AP has a wired connection to a wired network. The technique includes detecting a loss of connectivity from the AP to a controller of the mesh network through which traffic to and from the wireless mesh network is normally routed from and to the wired network. The technique includes, in response to detecting the loss of connectivity, if the AP is the root AP, operating the root AP as a proxy controller through which traffic to and from the wireless mesh network is routed from and to the wired network. The technique also includes optionally notifying each child AP of the loss of connectivity, and maintaining connectivity with parent and child APs over the wireless backhaul links that exist when the loss of connectivity is detected, so as to maintain the tree.

A second technique presented herein synchronizes wireless local area network (WLAN) and virtual local area network (VLAN) mappings in APs of a wireless mesh network. The second techniques may be performed in a mesh AP of the wireless mesh network, wherein the mesh AP is a child AP to a current parent AP. The second technique includes providing access to the mesh network via wireless connections to wireless clients in one or more WLANs served by the mesh AP, and storing current mappings between the one or more WLANs and one or more VLANs configured on the wired network to which the WLANs are assigned. The second technique also includes discovering a new parent AP, and roaming from the current parent AP to the new parent AP, wherein the roaming includes sending a registration request to the new parent AP to register as a child AP with the new parent AP, the registration request including all of the current WLAN/VLAN mappings stored in the mesh AP to be forwarded to the root AP by the new parent AP.

A variation of the second technique may also be performed at a mesh access point (mesh AP) in a wireless mesh network including a plurality of mesh APs and a root AP (RAP) forming a root of a tree of the mesh APs in which the mesh APs are linked back to the RAP through parent-child relationships over wireless backhaul links, the RAP having a connection to a wired network. The variation of the second technique includes providing access to the mesh network via wireless connections to wireless clients in one or more wireless local area networks (WLANs) served by the mesh AP, and storing mappings between the one or more WLANs served by the mesh AP and one or more virtual local area networks (VLANs) configured on the wired network and to which the WLANs are assigned. The variation of the second technique also includes receiving, from a parent access point (AP) of the mesh AP, mappings between the VLANs configured on the wired network and WLANs served by the mesh AP as known by the RAP. If the stored mappings and the received mappings differ, the variation of the second technique includes updating the stored mappings with the received mappings that differ from the stored mappings so that the stored mappings reflect the mappings known by the RAP.

A third technique presented herein relates to an AP roaming within and/or across Internet Protocol (IP) subnets of a mesh network organized as a spanning tree of mesh APs linked back to one or more root APs through parent-child relationships over wireless backhaul links. The APs of the spanning tree are divided among multiple IP subnets. The third technique includes a mesh AP roaming from a first parent AP to a second parent AP, and determining if the first and second parent APs are both members of a first IP subnet of the multiple IP subnets. If it is determined that the existing and new parent APs are members of the first IP subnet indicating that the mesh AP has roamed within the first IP subnet, connectivity with a first controller is maintained through which traffic to and from the first IP subnet is routed from and to the wired network, and a first IP address assigned to the mesh AP in the first IP subnet is maintained.

Example Embodiments

Referring first to FIG. 1, there is shown a block diagram of an example wireless mesh network 100, including: a plurality 102 of wireless access points (APs) (designated as either "mesh AP" or "RAP" in FIG. 1) wirelessly coupled by a wireless network of backhaul links L between the APs: a wired network 104, coupled to the APs, including one or more local area networks (LANs) and one or more wide area networks (WANs), such as the Internet; and a controller 106 coupled to the wired network 104 to control the mesh network 100, and particularly, the APs. Wired network 104 may include one or more routers and/or switches R to route traffic to and from the wired network. The wireless network of backhaul links L (referred to herein as "backhaul links" or "backhaul channels") of the APs form a hierarchical spanning-tree including multiple main tree branches A, B, and C (denoted A(IPSA), B(IPSB), and C(IPSC) for reasons that will be apparent from the description below). Each AP is configured and operates as a either a root AP (RAP) or a mesh AP (mesh AP) depending on its position, connections, and function in the respective one of branches A-C of mesh network 100, as will be now be described.

Each of branches A, B, and C includes a respective RAP 104A, 104B, and 104C that forms a root of the respective branch and has a respective one of wired connections WA, WB, and WC to wired network 104, and to one or more of routers/switches R in the wired network. Each of RAPs 104A-C has one or more respective descendent APs (which are the mesh APs) that communicate with each other and back to the RAP through backhaul links L (depicted as lightning bolts in FIG. 1), such that the RAP and the respective mesh APs collectively form a respective one of branches A-C of the spanning tree. For example, branch A includes RAP 104A and a descendent mesh AP 106A that communicate with each other through backhaul link L. Communications between APs over backhaul links L may operate in accordance with IEEE 802.11g. In the ensuing description, "AP" may refer generally to either an RAP or an mesh AP.

As seen if FIG. 1, the APs in each of branches A-C establish hierarchical, i.e., parent-child or ascendant-descendant, relationships with each other over the respective back haul links L. In branch A, root AP 104A is a parent AP of mesh AP 106A, and mesh AP 106A is considered a child AP of parent AP 104A. A child AP may have only one parent AP, but each child AP may itself be a parent AP of multiple children APs. For example, in branch B, root AP 104B is a parent of mesh AP 106B, which is itself a parent of two child APs, namely, mesh APs 108B and 110B.

Each AP in each of branches A-C of mesh network 100 may provide to clients served by the AP access to mesh network 100. To this end, each AP may communicate wirelessly with clients in one or more wireless local area networks (WLANs) served by that AP. APs may provide access to wireless clients over wireless access links in accordance with any of the IEEE 802.11 protocols, for example. In branch A, mesh AP 106A may communicate with a wireless client 114A in a WLAN 116A served by the AP. Similarly, in branch B, mesh APs 108B and 110B may communicate with wireless clients in respective WLANs 118B and 120B, while in branch C, mesh AP 130C may communicate with wireless clients in a WLAN 122C. Each AP may also provide client access to mesh network 100 through, e.g., wired Ethernet. One or more of WLANs 116A, 118B, 120B, and 122C served by the APs in mesh network 100 may be assigned to operate with one or more corresponding virtual local area networks (VLANs) VLAN 1, VLAN 2, . . . , VLAN N configured on wired network 104, e.g., in switches/routers R. When a WLAN is assigned to a VLAN, the WLAN is said to be "bound" or "mapped" to that VLAN.

Additionally, the APs of mesh network 100 may be divided among multiple Internet Protocol (IP) subnets, for example, the APs of branches A, B, and C of mesh network 100 may be part of first, second, and third IP subnets, respectively (i.e., each branch represents its own IP subnet). In the example, each IP subnet is identified by an IP subnet identifier (ID). For example, the first, second, and third IP subnets may be respectively identified with IP subnet identifiers IPSA, IPSB, and IPSC, as depicted in FIG. 1.

Controller 106 normally operates as a central controller of mesh network 100 to (i) maintain the topology of the mesh network, (ii) control the functionality of the APs, and (iii) route data traffic (referred to as "traffic") associated with each AP to and from wired network 104. To route traffic, controller 106 serves as a focal point for each AP through which traffic to and from the AP is routed. Such traffic includes data packets from a wireless client served by the AP and destined for the Internet, or data packets from the Internet destined for the client. A Control and Provisioning of Wireless Access Points (CAPWAP) protocol, described in large part in RFC 5415, may be used between each of the APs in mesh network 100 and controller 106 to enable the controller to perform the aforementioned control and AP traffic routing functions with respect to each AP. Embodiments described herein may conform generally to the CAPWAP protocol, unless new features are being added herein; however, it is to be understood that other similar/suitable wireless network control protocols are possible, as would be appreciated by those of ordinary skill in the relevant arts having access to the description herein.

At a high-level, under the CAPWAP Protocol, each AP in mesh network 100 discovers a controller, e.g., controller 106, over the network of backhaul links L. Then, the AP forms an individual, secure CAPWAP tunnel between itself and the discovered controller 106 over the backhaul links L. Controller 106 and the AP exchange CAPWAP management messages with each other through the CAPWAP tunnel. Also, traffic associated with the AP is routed to and from wired network 104 via a CAPWAP tunnel. In FIG. 1, an example CAPWAP tunnel 140 is formed between controller 106 and a mesh AP 106C connected to branch C of the spanning-tree. It is to be understood that the CAPWAP tunnel is shown by way of example only and is representative of any suitable encapsulating protocol tunnel that may be used herein.

Operating the CAPWAP Protocol across APs in the mesh network presumes that the APs have been organized into a hierarchical topology at least at some basic level. The APs may adaptively form this topology, e.g., the spanning-tree of mesh network 100 depicted in FIG. 1, through a tree-based routing process that builds a tree topology based on wireless backhaul links between the APs. An example tree-based routing process that may be used to form mesh network 100 is the Adaptive Wireless Path Protocol (AWPP) by Cisco Systems, Inc. Using such a process, the tree topology may be built as a RAP and mesh APs discover one another, and each mesh AP selects a parent AP among potential parent APs that provides a least-cost path to the RAP. In an example where each AP advertises to its neighbor APs a path cost back to the RAP, the neighbor APs can make a parent AP selection based on a least one of the advertised path costs. An example path cost is a number of hops, i.e., backhaul links that must be traversed, to get from the potential parent (advertising) AP to the RAP.

Several techniques are presented herein to improve operation of mesh network 100. A first of the techniques referred to as a "Controller Lost" technique relates to a continued operation of mesh network 100 when AP connectivity with controller 106 is lost. A second technique referred to as a "WLAN/VLAN Synchronization" technique relates to propagating WLAN/VLAN mappings or bindings between APs up and down a given branch of mesh network 100 to ensure that the mappings are current, i.e., synchronized. A third technique referred to as an "AP IP Subnet Roaming" technique relates to when a child AP roams to different parent APs within and/or across IP subnets in mesh network 100. The three techniques are now described in brief.

Controller Lost Technique

As described above, controller 106 normally establishes individual CAPWAP tunnels with each of the APs to maintain the topology of mesh network 100, manage the APs, and route traffic to and from the APs. If, for example, controller 106 fails or is powered-down (or the connection between the RAP and the controller 106 goes down) such that AP-controller connectivity is lost, then the mesh network may break down and traffic to and from the wireless mesh network can no longer be routed through the controller. To overcome the possibility of such lost service, the Controller Lost technique continues to operate the APs of mesh network 100 when controller connectivity is lost in such a way that the topology of the mesh network (through the wireless backhaul links L) is maintained and traffic associated with each AP may still be routed to and from wired network 104—in the absence of controller 106. To achieve such continuity, a RAP (e.g., RAP 104A) with a wired connection to a router/switch (e.g., router/switch R) in wired network 104 assumes a role of a proxy controller in place of the controller, and traffic associated with each mesh AP is routed to and from the wired network through the proxy controller. Under the Controller Lost technique, the backhaul links L are resilient to the loss of connectivity and are, therefore, referred to as "resilient backhaul links." Also, WLAN traffic is switched locally at the router connected to the RAP, hence the name "WLAN traffic local switching."

WLAN/VLAN Synchronization Technique

VLANs are configured on wired network 104. VLANs may be added and deleted dynamically. Also, WLANs are assigned to VLANs and may also be added and deleted dynamically. To ensure appropriate routing of WLAN traffic within the VLANs to which they are assigned, each AP in mesh network 100 stores a mapping of the WLANs served by the AP and the VLANs to which those WLANs are assigned in the wired network. As VLANs are added and/or deleted from wired network 100, the WLAN/VLAN mappings in each AP must be correspondingly updated to reflect the changes. According to the WLAN/VLAN Synchronization technique, the WLAN/VLAN mappings that reflect the changes are propagated up and down each of branches A, B, and C of mesh network 100 via the APs (mesh APs and RAPs) to ensure each AP has a current WLAN/VLAN mapping. In an embodiment, WLAN/VLAN mappings are synchronized in this way after a child AP roams from a first parent AP to a second parent AP.

AP IP Subnet Roaming Technique

For a number of reasons, a child AP (mesh AP) to a current parent AP operating in a given IP subnet of mesh network 100 may decide to roam to a new parent AP. The new parent AP may be in the same IP subnet as the current parent AP or in a different IP subnet from the current parent AP. The AP IP Subnet Roaming technique implements message exchanges between the child AP and its new parent AP to ensure that the child AP can continue to operate effectively and serve its clients whether the child AP roams within the same or a different IP subnet.

AP Architecture

Figure 2:
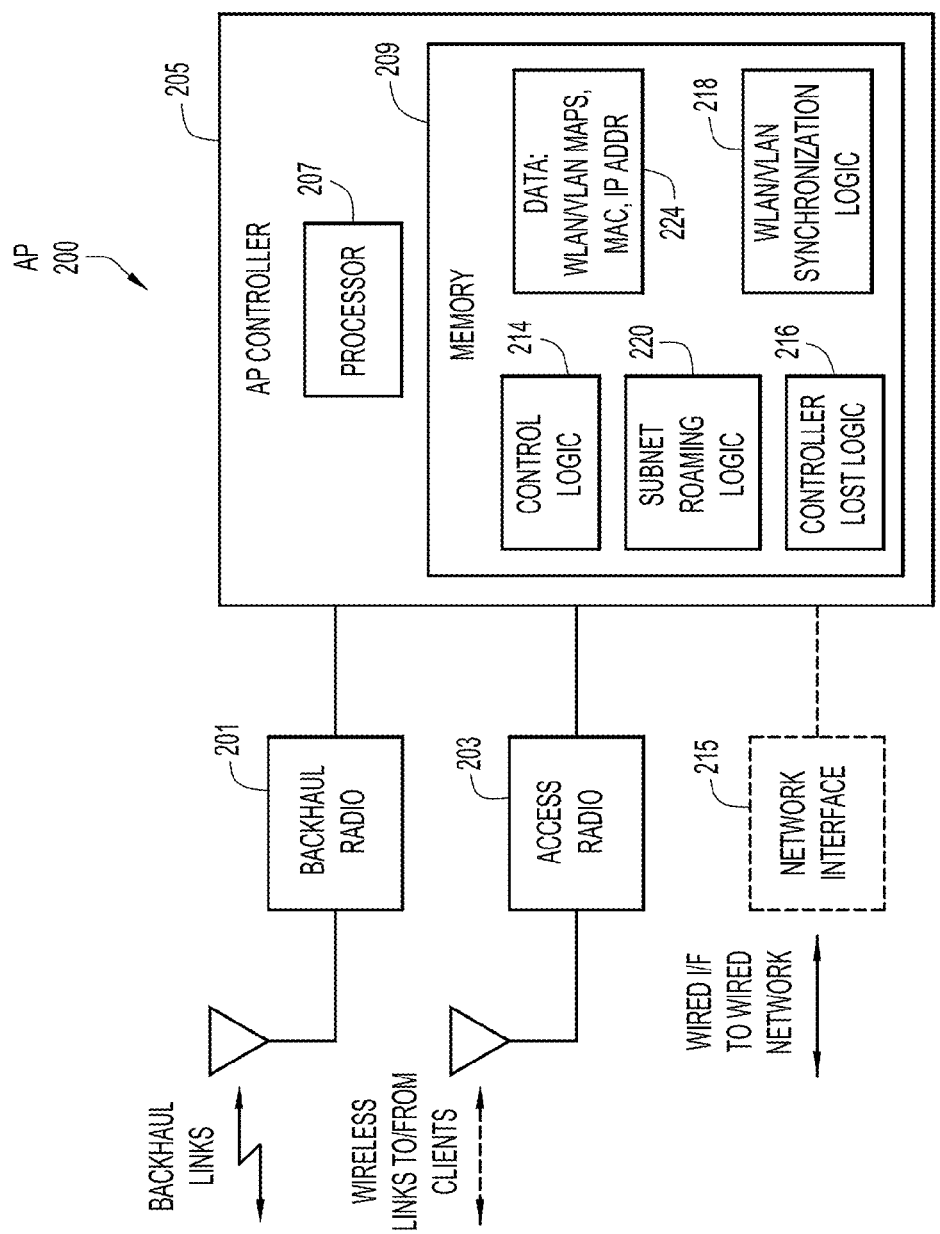
FIG. 2 is a block diagram of an example wireless access point (AP) of the mesh network of FIG. 1, which AP may be a root AP (RAP) or a mesh AP (mesh AP) configured to perform operations to implement techniques provided herein.

With reference to FIG. 2, there is shown a block diagram of an example AP 200 of mesh network 100 configured to perform operations according to techniques provided herein. AP 200 may be configured as a RAP or a mesh AP, such as RAP 104A or mesh AP 106A, respectively. AP 200 includes a wireless backhaul radio 201 (also referred to a transmitter/receiver or "transceiver" 201) to support wireless backhaul links, a wireless access radio 203 to support access for wireless clients served by the AP, and an AP controller 205 to which the backhaul and access radios are coupled. In an embodiment, radios 201 and 203 are integrated into a single radio. Backhaul radio 201 may operate according to IEEE 802.11a in the approximately 5 Gigahertz band, and access radio 203 may operative according to IEEE 802.11b/g in the approximately 2.4 GHz band. Each radio includes a respective set of one or more antennas. AP 200 may include a wired network interface 215 that enables the AP to connect to wired network 104 and thereby operate as a root AP. Alternatively, AP 200 may operate as a mesh AP.

Controller 205 includes a processor 207 and memory 209. Processor 207 is a microcontroller or microprocessor, for example, configured to execute software instructions stored in memory 209. Memory 209 may comprise read only memory (ROM), random access memory (RAM), magnetic disk storage media devices, optical storage media devices, flash memory devices, electrical, optical, or other physical/tangible (e.g., non-transitory) memory storage devices.

Thus, in general, memory 209 may comprise one or more computer readable storage media (e.g., a memory device) encoded with software comprising computer executable instructions and when the software is executed (by processor 207) it is operable to perform the operations described herein.

For example, memory 209 stores or is encoded with instructions for:

a. Control logic 214 to perform overall control of AP 200;
b. Controller Lost logic 216 to operate the AP when connectivity to controller 106 is lost;
c. WLAN/VLAN Synchronization logic 218 to synchronize WLAN/LAN mappings in the AP; and
d. IP Subnet Roaming Logic 220 to support AP child roaming within or across IP subnets.

Logic modules 214, 216, 218, and 220 are depicted as separate and distinct from Control logic 214 in FIG. 2 for purposes of convenience; however, it is to be understood that portions of each of logic modules 214, 216, 218, and 220 are, in practice, incorporated into Control logic 214. Moreover, logic modules 214-220 perform RAP operations when AP 200 operates as a RAP and mesh AP operations when AP 200 operates as a mesh AP.

Memory 209 also stores information/data 224 used by logic 214-220, including, but not limited to, WLAN/VLAN mappings, Media Access Control (MAC) addresses, IP subnet IDs, IP addresses, and so on.

Figure 3:
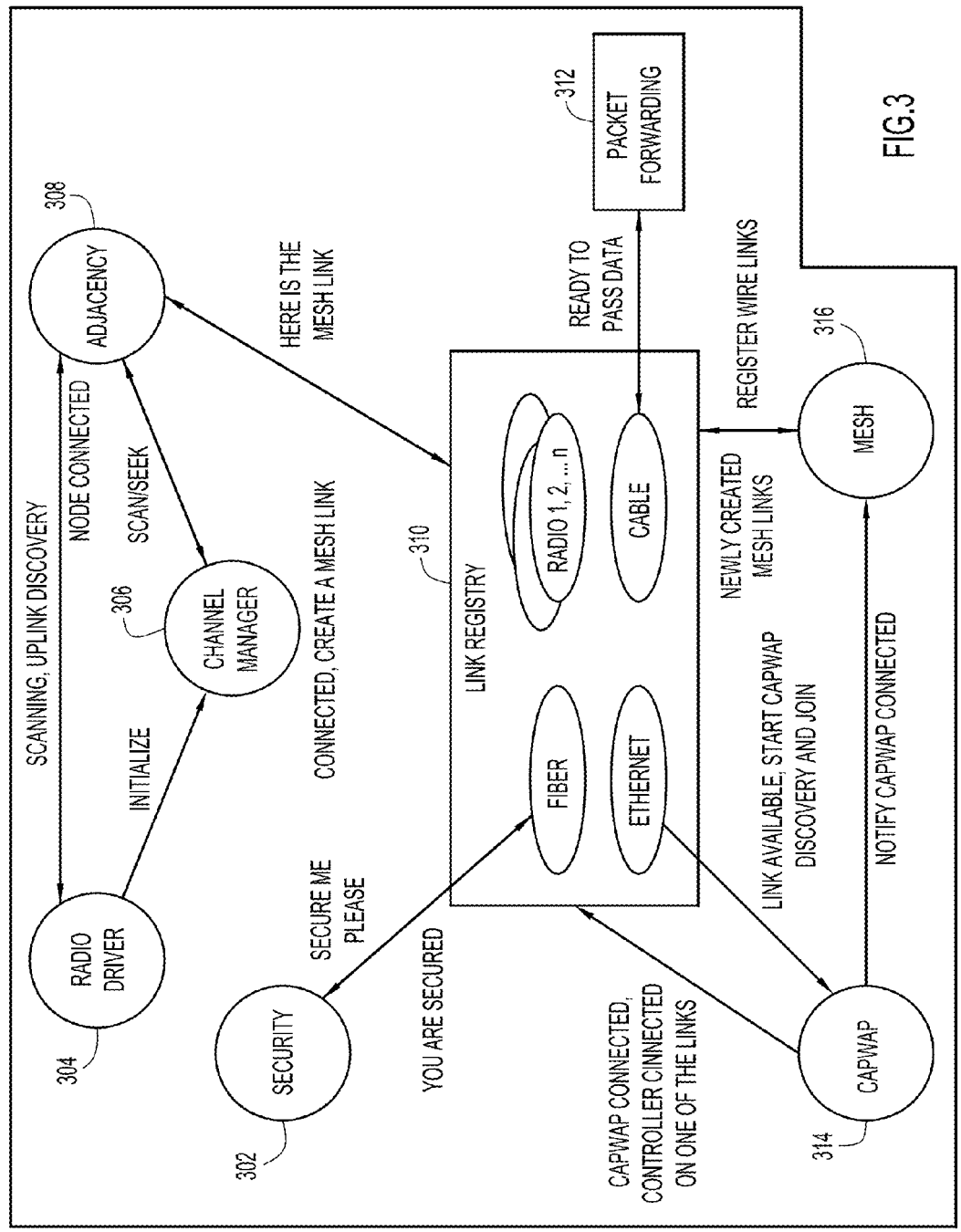
FIG. 3 is a block diagram of control logic in an AP, the control logic configured to perform the various techniques presented herein.

With reference to FIG. 3, there is shown a block diagram of Control logic 214. Control logic 214 includes a plurality of controller modules, including: a Security Module 302, a Radio Driver 304, a Channel Manager 306, an Adjacency Module 308, a Link Registry 310, a Packet Forwarding Module 312, a CAPWAP Module 314, and a Mesh Module 316. Modules 302-316 of Control logic 214 incorporate portions of Controller Lost logic 216, WLAN/VLAN Synchronization logic 218, and IP Subnet Roaming Logic 220 as necessary to implement techniques provide herein.

Link Registry 310 creates and manages (and registers) all active wired and wireless links of the AP. Link Registry 310 stores information for each link, such as state information, that is accessed by other modules in Controller logic 214 as necessary.

CAPWAP Module 314 implements a CAPWAP state machine (SM) and associated protocol timers that have an instance in the AP and a corresponding or mirror instance in the controller. As indicated in FIG. 3, Link Registry 310 communicates available links to CAPWAP Module 314 to initiate CAPWAP discovery of and join to a given controller (e.g., controller 106) by the CAPWAP Module, and the CAPWAP Module communicates status regarding connectivity to a given controller via the backhaul links to the Link Registry. In accordance with the Controller Lost technique, if controller connectivity is lost, the CAPWAP SM maintains its current state, continues to operate its normal protocol timers, except that it attempts to discover a controller. This ensures that the AP continues to maintain the backhaul links that were in existence at the time the controller connectivity was lost, after the controller connectivity is lost.

Mesh Module 316 implements an AWPP SM and associated protocol timers to build and maintain links of a mesh network through backhaul links (e.g., to parent and child APs). Mesh Module 316 and CAPWAP module 314 exchange respective state information reflective of link connectivity with a controller (e.g., "Notify CAPWAP connected" message).

Adjacency Module 308 handles channel scanning, discovery of a parent AP, calculates and updates backhaul metrics related to path cost, and interacts with Radio Driver 304 to establish an association with an optimal parent AP, i.e., a parent advertising a least-cost path. Such functions may be shared with Mesh Module 316. Mesh Module 316 and Adjacency Module 316 may be merged into one module. Adjacency Module 316 and/or Mesh Module 316 may include the following states: Start, Seek, Sync, Auth, Maint, and Scan. Each state implements a function. In accordance with the Controller Lost technique, if controller connectivity is lost, the AWPP SM (implemented in Mesh Module 316 and/or Adjacency Module 308) maintains its current state and continues to operate its normal protocol timers. This ensures that the AP continues to maintain the backhaul links that were in existence at the time the controller connectivity was lost.

Channel Manager 306 (also referred to as Backhaul and Channel Manager 306) provides backhaul and channel information to Adjacency Module 308 and/or Mesh Module 316 to enable scanning and connection to an optimal parent AP. To this end, Channel Manager 306 collects radio information from Radio Driver 304.

Packet Forwarding Module 312 includes mesh bridging and routing logic and records traffic (e.g., packet) forwarding and routing paths, such as: wireless-wireless, e.g., child mesh AP to parent mesh AP, and parent RAP or mesh AP to child mesh AP; wireless to Ethernet/Fiber/Cable, and so on.

Radio Driver 304 may support any of IEEE 802.11a/b/g/n/ac/ad for the backhaul links.

Security Module 302 implements a state machine that assists with authentication, Dynamic Host Configuration Protocol (DHCP) discovery to obtain IP addresses, and CAPWAP discovery to discover a controller with which to connect over a CAPWAP tunnel.

RAP Event Diagram

Figure 4:
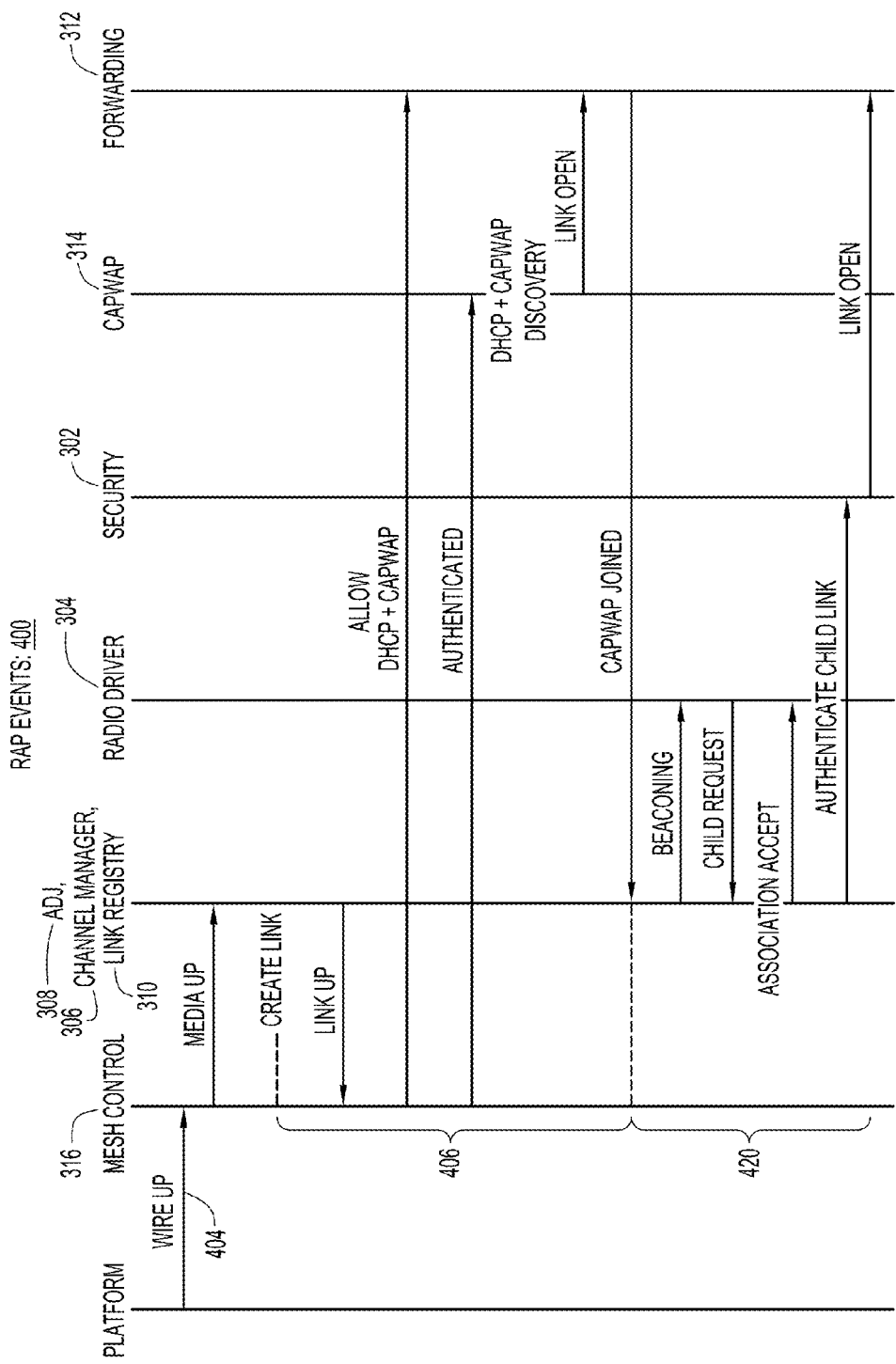
FIG. 4 is an example event diagram for a RAP.

Turning now to FIG. 4, there is shown an example event (thread) diagram 400 for an RAP. Thread diagram 400 reflects a sequence of link states, events, and messages that relate to modules 302-316 of Control logic 214 as implemented in the RAP. In the description of FIG. 4, the RAP may be any of RAPs 104A-C and the controller refers to controller 106 or any other suitable controller.

At 404, a wired interface ("platform") of the RAP reports that the RAP is connected to a wired interface, e.g., WA, of wired network 104. In other words, at 404, the RAP discovers a root port of the RAP.

At 406, the depicted sequence of events creates a link, i.e., establishes connectivity, between the RAP and a controller over the wired interface. The RAP establishes a CAPWAP tunnel with the controller, and performs DHCP discovery to solicit and obtain an IP address.

At 420, the RAP establishes a parent-child relationship with a mesh AP over a backhaul link, in which the mesh AP becomes a child AP of the RAP (i.e., the RAP is the parent of the child AP).

If the RAP loses connectivity with a controller, the RAP maintains its established backhaul links and relationships with descendent APs (i.e., mesh APs).

Mesh AP Event Diagram

Figure 5:
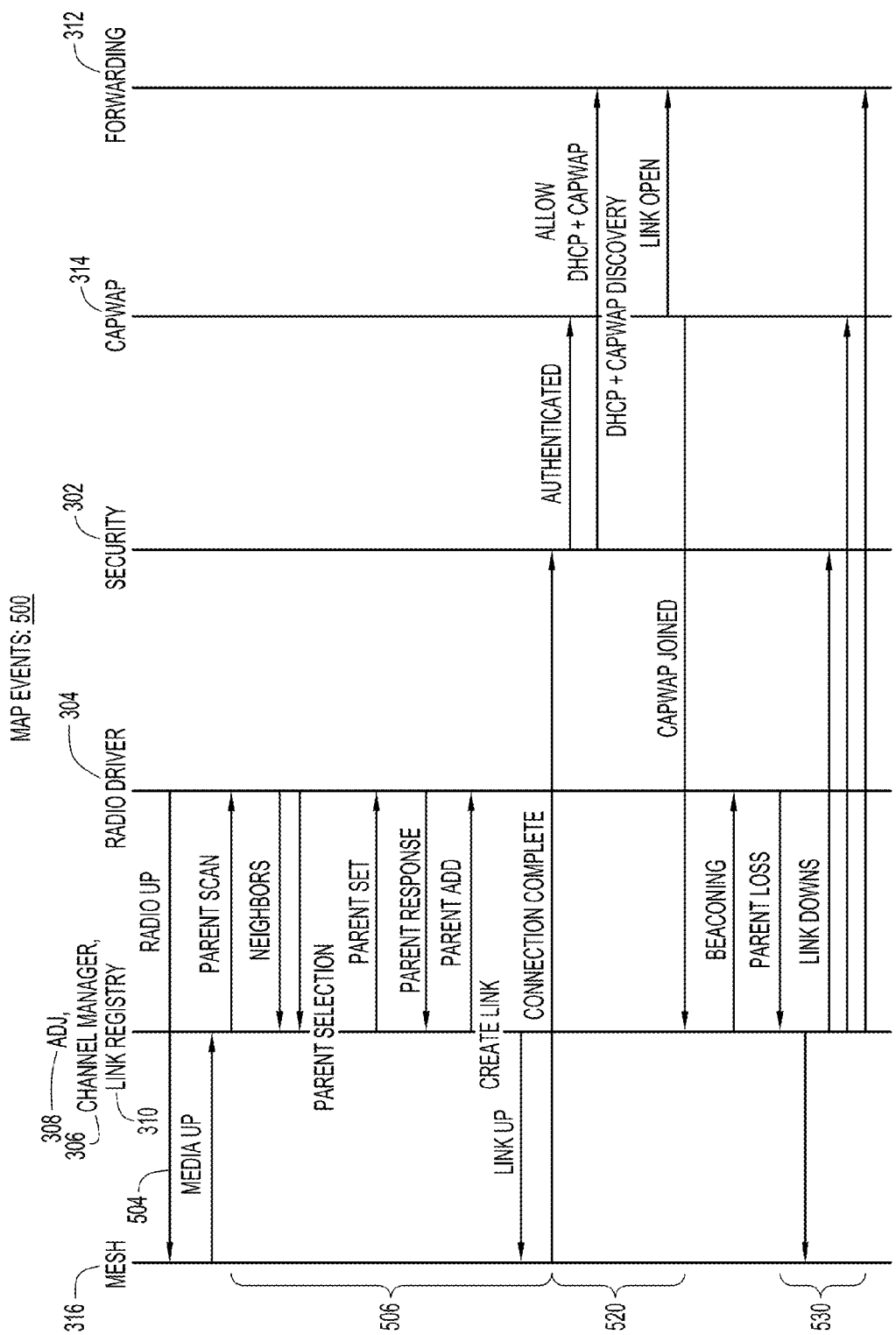
FIG. 5 is an example event diagram for a mesh AP.

Turning now to FIG. 5, there is shown an example event diagram 500 for a mesh AP. Thread diagram 500 reflects a sequence of link states, events, and messages that relate to modules 302-316 of Control logic 214 as implemented in the mesh AP. In the description of FIG. 5, the mesh AP may be any of the mesh APs depicted in FIG. 1 and the controller refers to controller 106 or any other suitable controller.

At 504, Radio Driver 304 indicates that the backhaul radio is operating.

At 506, the mesh AP scans its backhaul links for an optimal parent AP with which to join as a child AP. The optimal parent AP is the parent AP among potential parent APs that advertises a least-cost path to an RAP. The mesh AP joins the selected parent mesh AP (or an RAP) as a child mesh AP.

At 520, the mesh AP AP performs DHCP discovery to obtain an IP address, and establishes connectivity with a controller over a CAPWAP tunnel.

At 530, if the mesh AP loses connectivity with the parent AP, then the backhaul links are removed; however, if the mesh AP loses connectivity with a controller, the backhaul links are maintained and all of the mesh AP's parent-child relationships are maintained.

AWPP State Machine

Figure 6:
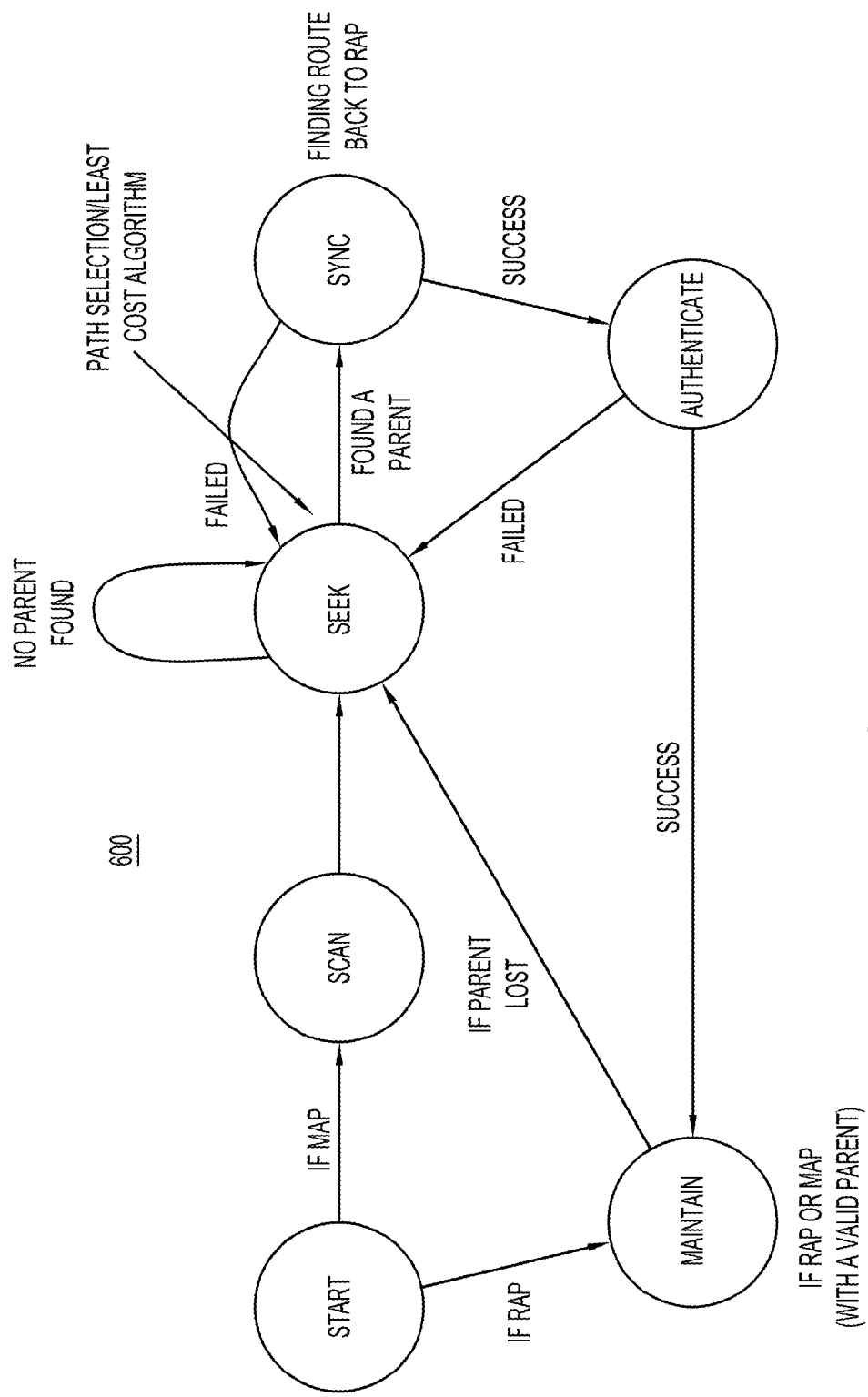
FIG. 6 is a diagram of an example state machine to form and maintain a mesh network topology through backhaul links of a mesh network.

FIG. 6 is an illustration of an example AWPP state machine 600 (also referred to as a "mesh state machine") to form and maintain a mesh network topology through backhaul links, which may be implemented in Adjacency Module 308 and/or Mesh Module 316. State machine 600 communicates with CAPWAP Module 314. State machine 600 includes multiple states (i.e., Start, Scan, Seek, Sync, Authenticate, and Maintain) depicted as circles in FIG. 6, with state transition events, such as "If Map, "Failed," "Success," etc., leading to and from the states.

After an AP is powered-on, the mesh state machine sequence is as follows:

a. Upon boot-up, the AP determines whether it is an RAP, i.e., if it has a wired connection to a wired network. If the AP is an RAP, then the AP enters the Maintain state;

b. If the AP is not an RAP, i.e., it is an mesh AP, then the AP scans all backhaul links/channels using mesh beaconing (Scan state);

c. The AP actively solicits neighboring APs (Seek and Sync states);

d. The AP selects the best parent from the available parent APs based on advertised path costs (Seek and Sync states);

e. The AP authenticates to the mesh network (Authenticate state); and f. The AP then enters the Maintain state and is willing to respond to solicitations. In accordance with the Controller Lost technique, the AP stays in the Maintain state in the event connectivity with a controller is lost.

State machine 600 operates such that an AP with a path to an RAP advertises a path cost to that RAP, e.g., a number of hops to the RAP. In normal operation, the AP advertises an actual path cost, e.g. the actual number of hops to the RAP. An example actual path cost may be 3 hops. When connectivity between the AP and a controller is established, the AP continues to advertise the actual cost path. Any child AP or neighbor AP of the AP will receive the advertised actual path cost. In accordance with the Controller Lost technique, if and when connectivity to the controller is lost, the AP advertises an artificially reduced path cost to the RAP that is less than the actual path cost. For example, the artificially reduced path cost may be 1 or 2 hops instead of 3 hops. Because APs in the mesh network select a parent AP that advertises a least-cost path back to the RAP, advertising the artificially reduced path cost discourages/inhibits a child AP from roaming from its existing parent AP (which is advertising the artificially reduced path-cost) to a different parent AP and, thus, encourages the child AP to remain with its current parent AP. As soon as controller connectivity is re-established, the AP advertises the actual path cost again, e.g., 3 hops.

Controller Lost Flowchart

Figure 7:
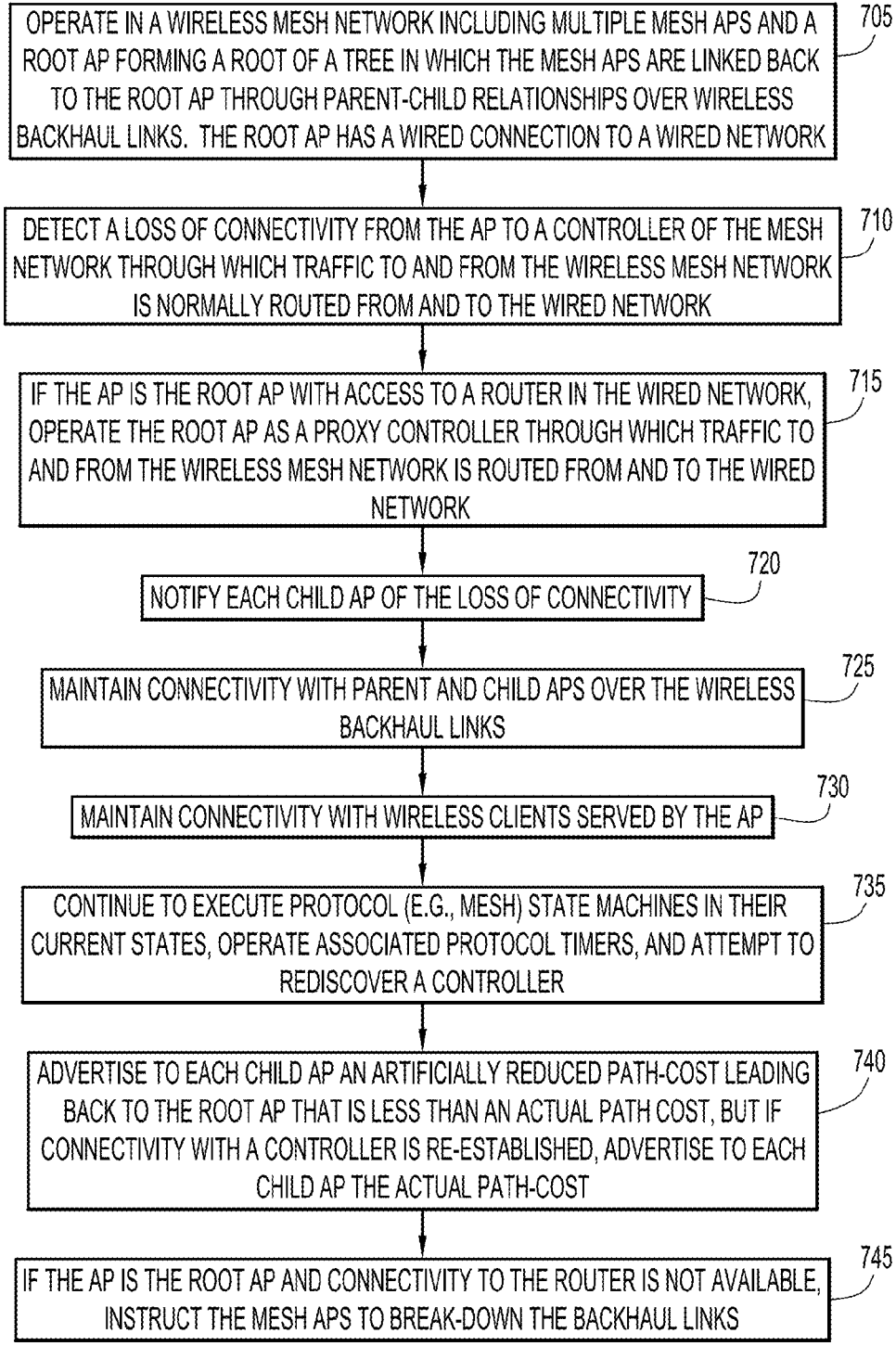
FIG. 7 is a flowchart of an example method of operating an AP when connectivity between the AP and a controller is lost.

With reference to FIG. 7, there is shown a flowchart of an example method 700 of operating an AP (RAP or mesh AP) in a mesh network (e.g., mesh network 100) when controller connectivity between the AP and a controller (e.g., controller 106) is lost. The operations of method 700 are performed by Controller Lost logic 216 in association with the modules of Control logic 214 depicted in FIG. 3.

At 705, the AP operates in the wireless mesh network, the mesh network including multiple mesh APs and a RAP forming a root of a tree in which the mesh APs are linked back to the root AP through parent-child relationships over wireless backhaul links. The root AP has a wired connection to a wired network.

At 710, the AP detects a loss of connectivity from the AP to the controller of the mesh network through which traffic to and from the wireless mesh network is normally routed from and to the wired network.

At 715, if the AP is the RAP with access to a router in the wired network, the RAP assumes the role of and operates as a proxy controller through which traffic to and from the wireless mesh network is routed from and to the wired network.

At 720, the AP may optionally notify each of its child APs, if any, of the loss of connectivity to the controller.

At 725, the AP maintains connectivity with parent and child APs over the wireless backhaul links (in existence at the time the connectivity to the controller was lost).

At 730, the AP maintains connectivity with wireless clients, i.e., continues to provide to the wireless clients it serves access to the mesh network through which traffic associated with the clients may be routed to and from the wired network. The wireless clients may participate in WLANs that are served by the AP.

At 735, the AP continues to execute protocol state machines (e.g., CAPWAP and AWPP state machines) in their current states, and operate associated protocol timers, except that the AP continues to attempt to discover a controller.

At 740, the AP advertises to each child AP an artificially reduced path-cost leading back to the root AP that is less than an actual path cost to discourage/inhibit each child AP from roaming anywhere else while connectivity to the controller is lost. If connectivity with a controller is re-established, the AP advertises to each child AP the actual path-cost.

At 745, if the AP is the RAP and connectivity to the router is not available, the RAP instructs descendent APs (the mesh APs) to break-down the backhaul links and dissolve the mesh network.

WLAN/VLAN Synchronization Flowcharts

Figure 8:
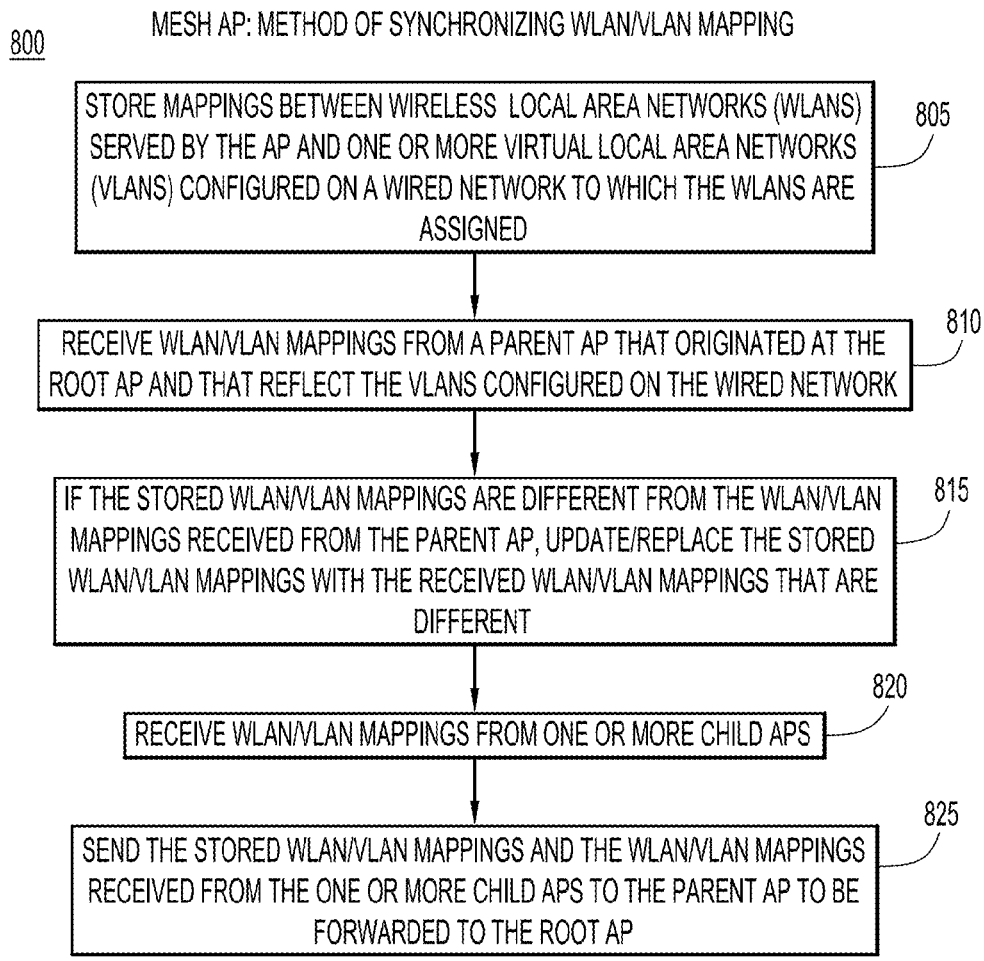
FIG. 8 is a flowchart of an example method, performed in a mesh AP, of synchronizing wireless local area network (WLAN)/virtual local area network (VLAN) mappings.
Figure 9:
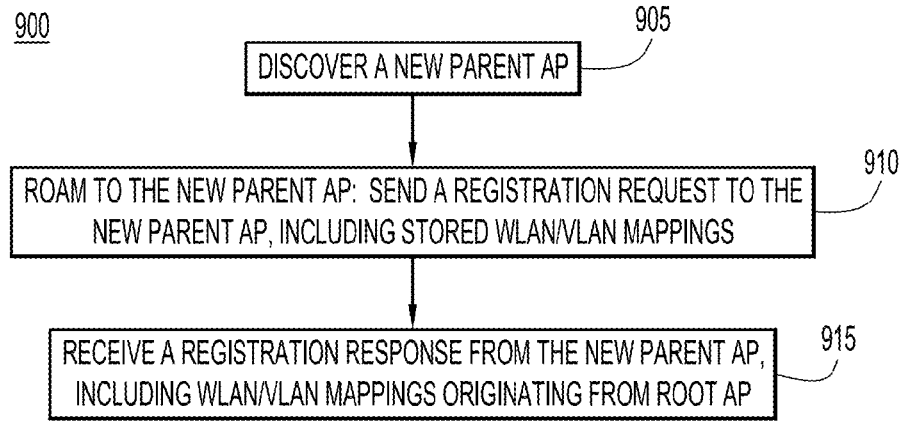
FIG. 9 is a flowchart of an example method, performed in a mesh AP, of synchronizing WLAN/VLAN mappings while the mesh AP roams from a first parent AP to a second parent AP.
Figure 10:
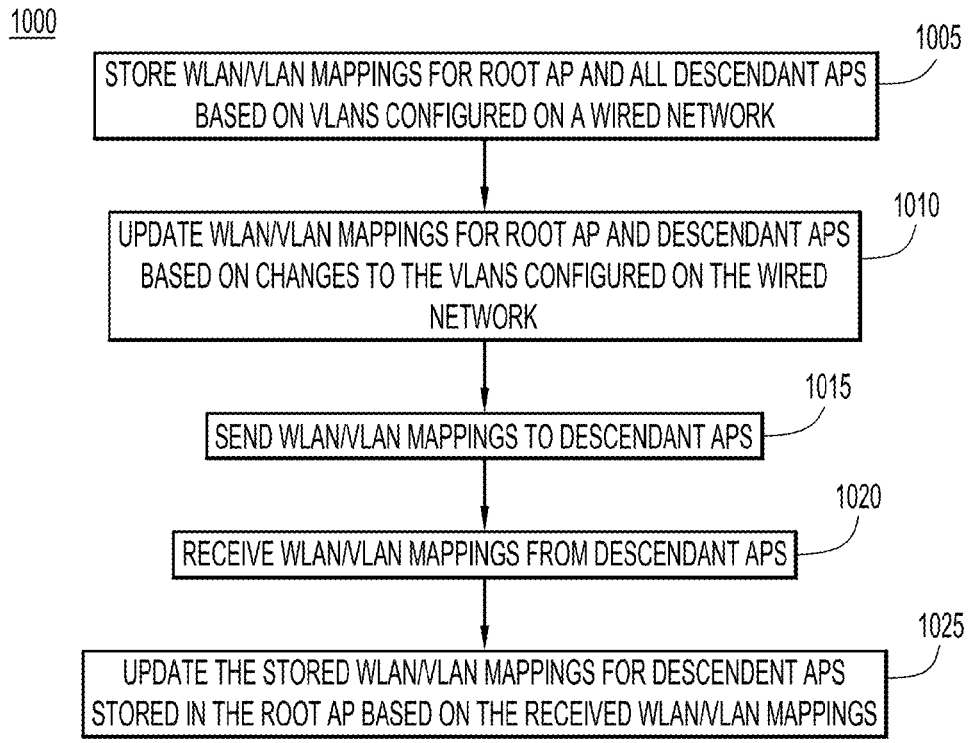
FIG. 10 is a flowchart of an example method, performed in a RAP, of synchronizing WLAN/VLAN mappings.

FIGS. 8-10 described below are flowcharts related to WLAN/VLAN synchronization methods. The operations performed in each of the WLAN/VLAN synchronization methods are performed by WLAN/VLAN Synchronization logic 218 in association with the modules of Control logic 214 depicted in FIG. 3.

With reference to FIG. 8, there is shown a flowchart of an example method 800 of synchronizing WLAN/VLAN mappings performed in a mesh AP in a mesh network.

At 805, the mesh AP stores mappings between WLANs served by the mesh AP and one or VLANs configured on a wired network to which the WLANs are assigned.

At 810, the mesh AP receives WLAN/VLAN mappings from a parent AP that originated at a RAP and that reflect the VLANs configured on the wired network as known by the RAP.

At 815, if the stored WLAN/VLAN mappings are different from the WLAN/VLAN mappings received from the parent AP, the mesh AP updates/replaces the stored WLAN/VLAN mappings with the received WLAN/VLAN mappings that are different (i.e., that do not match the stored WLAN/VLAN mappings).

At 820, the mesh AP receives WLAN/VLAN mappings from one or more child APs of the mesh AP. The mesh AP sends the stored WLAN/VLAN mappings and the WLAN/VLAN mappings received from the one or more child APs to the parent AP to be forwarded to the RAP so the RAP can update its WLAN/VLAN mappings relating to the mesh AP.

With reference to FIG. 9, there is shown a flowchart of an example method 900 of synchronizing WLAN/VLAN mappings while the mesh AP roams from a current parent AP to a new parent AP. Method 900 is performed in the mesh AP.

At 905, the mesh AP discovers a new parent AP.

At 910, the mesh AP roams to the new parent AP. To do this, the mesh AP sends a registration request to the new parent AP, including WLAN/VLAN mappings stored in the mesh AP.

At 915, the mesh AP receives a registration response from the new parent AP, including WLAN/VLAN mappings stored in the new parent AP and that originated from an RAP. The mesh AP updates (i.e., overwrites) its stored WLAN/VLAN based on the WLAN/VLAN mappings received in the registration response, to the extent there are differences.

With reference to FIG. 10, there is shown a flowchart of an example method 1000 of synchronizing WLAN/VLAN mappings that is performed in a RAP. Method 1000 is the RAP corollary of the method 900 performed in the mesh AP.

At 1005, the RAP stores WLAN/VLAN mappings for the RAP and all descendant APs (mesh APs) based on VLANs configured on a wired network to which the RAP is connected through its root port.

At 1010, the RAP updates WLAN/VLAN mappings for the RAP and descendant APs based on changes to the VLANs configured on the wired network, if any.

At 1015, the RAP sends WLAN/VLAN mappings to descendant APs, and receives WLAN/VLAN mappings from descendant APs.

At 1020, the RAP updates the stored WLAN/VLAN mappings for descendent APs stored in the root AP based on the received WLAN/VLAN mappings.

AP IP Subnet Roaming Flowchart

Figure 11:
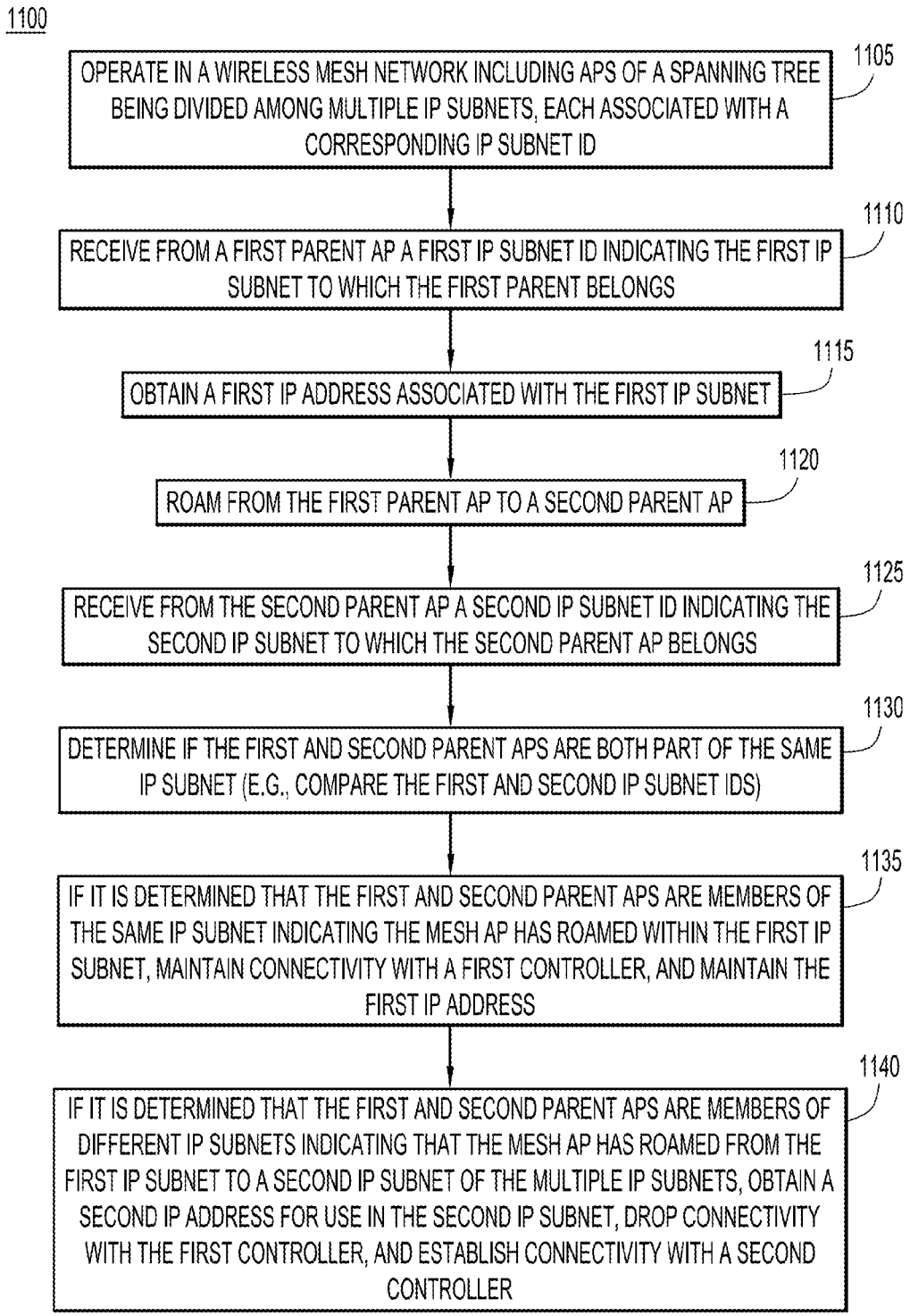
FIG. 11 is a flowchart of an example method, performed in a mesh AP, of roaming between Internet Protocol (IP) subnets of a mesh network.

With reference to FIG. 11, there is shown a flowchart of an example method 1100 of an mesh AP roaming between parent APs within or across IP subnets of a mesh network. The operations of method 1100 are performed by IP Subnet Roaming logic 218 in association with the modules of Control logic 214 depicted in FIG. 3.

At 1105, the mesh AP operates in a wireless mesh network including APs of a spanning tree being divided among multiple IP subnets, each associated with a corresponding IP subnet ID.

At 1110, the mesh AP receives from a first parent AP to which the mesh AP is a child a first IP subnet ID indicating the first IP subnet to which the first parent AP belongs.

At 1115, the mesh AP obtains a first IP address associated with the first IP subnet.

At 1120, the mesh AP roams from the first parent AP to a second parent AP.

At 1125, the mesh AP receives from the second parent AP a second IP subnet ID indicating the second IP subnet to which the second parent AP belongs.

At 1130, the mesh AP determines if the first and second parent APs are both part of the same IP subnet (e.g., the mesh AP compares the first and second IP subnet IDs).

At 1135, if it is determined that the first and second parent APs are part of the same IP subnet indicating the mesh AP has roamed within the first IP subnet, the mesh AP maintains connectivity with a first controller, and continues to use the first IP address.

At 1140, if it is determined that the first and second parent APs are members of different IP subnets indicating that mesh AP has roamed from the first IP subnet to a second IP subnet of the multiple IP subnets, the mesh AP obtains a second IP address for use in the second IP subnet, drops connectivity with the first controller, and establishes connectivity with a second controller. The second controller may be the same as or different from the first controller.

WLAN/VLAN Mapping Example

Figure 12:
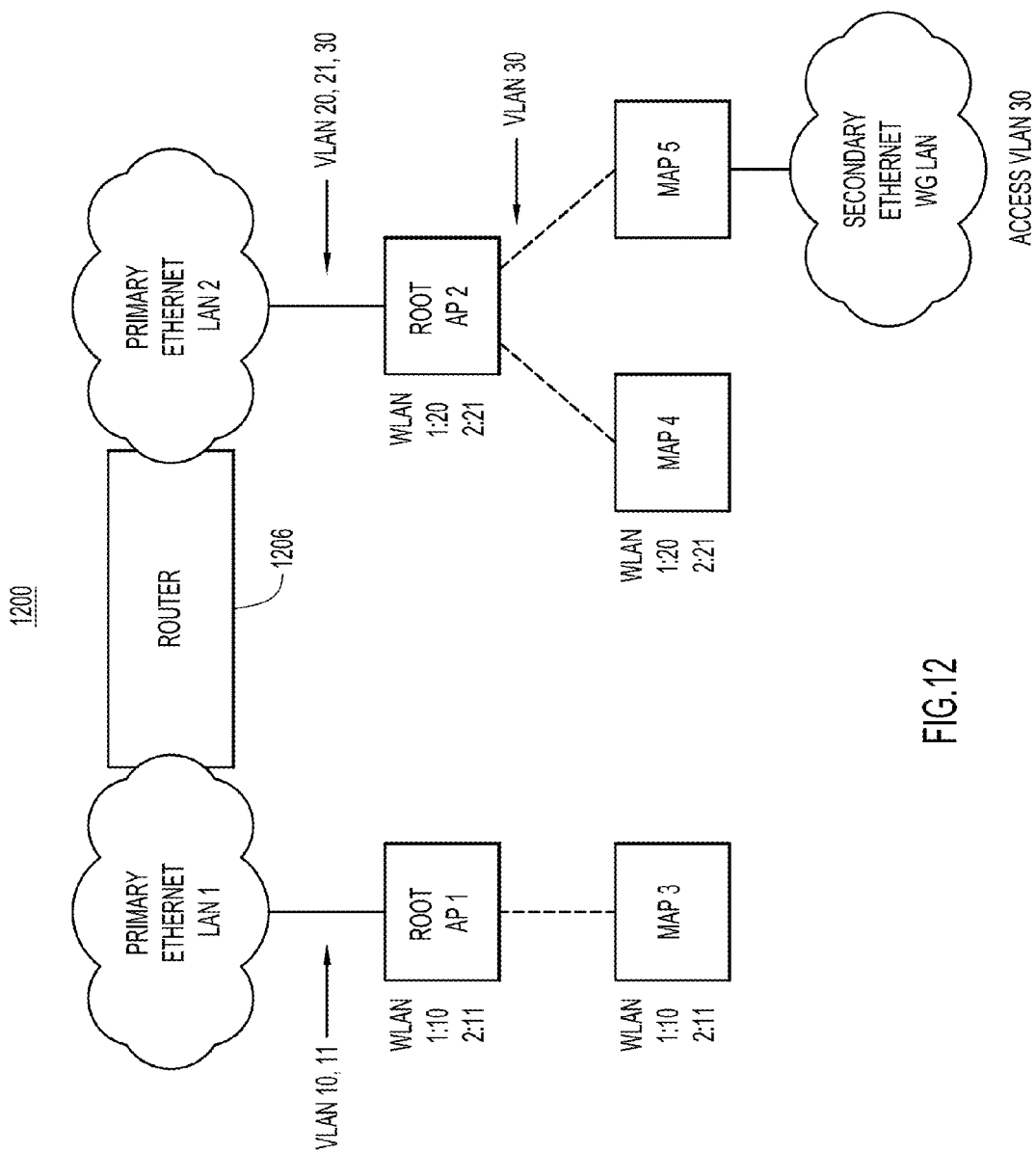
FIG. 12 is an illustration of example WLAN/VLAN mappings in a mesh network.

With reference to FIG. 12, there is an illustration of example WLAN/VLAN mappings in a mesh network 1200, which may be part of mesh network 100 from FIG. 1. Mesh network 1200 includes RAPs 1 and 2 having respective wired connections to Ethernet LANs 1 and 2. The APs depicted in FIG. 12 are organized into mesh spanning trees. A router 1206 is also connected to Ethernet LANs 1 and 2. RAP 1 has a descendant mesh AP 3, and RAP 2 has two descendant mesh APs 4 and 5. VLANs 10, 11, 20, 21, and 30 are configured on router 1206.

Any VLANs that are active on descendant links, in the spanning trees, are automatically propagated to ancestor links. For example, the three VLANs 20, 21, and 30, are automatically installed on AP2's link to the primary LAN 2 because the three VLANs are active on descendant links in the sub-tree rooted at AP2. Furthermore, any WLAN/VLAN bindings that are active on a root AP are propagated to descendant APs. A descendant AP generates a Registration Request to register its VLAN bindings with the root AP. When the root AP receives the Registration Request, it updates the VLAN bindings in the Registration Request, as required, and returns a Registration Reply to the descendant AP. The root AP adds any newly introduced VLANs to its root port and to the backhaul port to the descendant AP. Likewise, the descendant AP and any intermediate AP update their VLAN bindings when they receive the Registration Reply message.

Figure 13:
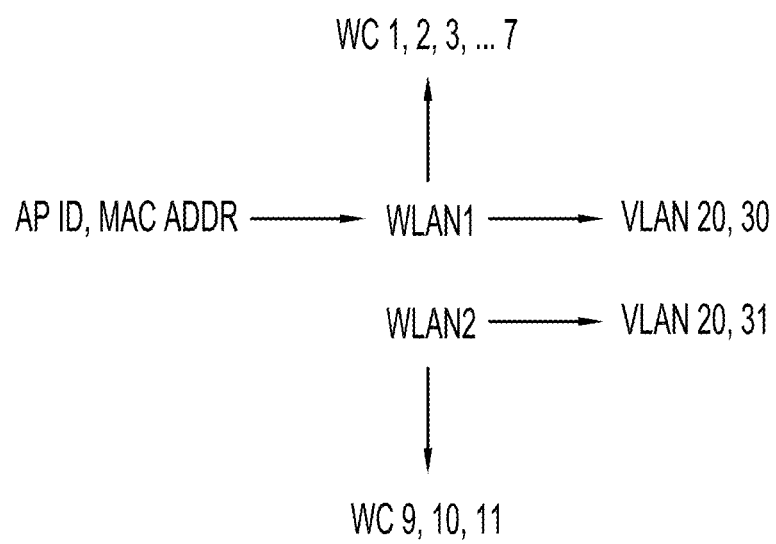
FIG. 13 is an illustration of example WLAN/VLAN mappings stored in a AP.

With reference to FIG. 13, there is an illustration of WLAN/VLAN mappings 1300 stored in an AP. The AP is assigned an AP ID and a MAC address. The AP ID and MAC address map to WLANs 1, 2 served by the AP. In turn, WLANs 1, 2 map to VLANs 20, 30 and 20, 31, respectively, configured on a wired network to which the WLANs are assigned.

Mappings 1300 also include wireless client (WC) identifiers 1-7 and 9-11 (which may be client addresses) that are part of WLANs 1, 2, respectively. WLAN/VLAN mappings 1300 are passed between ascendants and descendants of the AP as described above in connection with the WLAN/VLAN synchronization methods of FIGS. 8-10.

Summary of the Techniques Presented

Controller Lost Technique

The Controller Lost technique includes the following features. When a controller of a wireless mesh network is lost or down, or connectivity with the controller is otherwise interrupted, a RAP connected to a wired network becomes a proxy controller of the mesh network. The mesh protocol (e.g., AWPP) states, timers, and messages are maintained during the controller down time and, as a result, wireless backhaul links between the APs are maintained. Traffic is switched to the wired network through a local switch/router in the wired network that is connected to the RAP, rather than through the controller, which not available. Therefore, the resilient backhaul links facilitate local switching of WLAN and wireless client traffic to the wired network.

mesh APs no longer dissolve the wireless backhaul links when the controller is lost, and maintain connectivity with the wireless clients that they serve on their WLANs. The CAPWAP protocol state machines and timers continue to operate and attempt to re-discover a controller during the down time through the resilient backhaul links. This avoids a complete CAPWAP protocol re-start as a result of controller connectivity loss.

Because accidental and un-needed child AP roaming can disrupt the wireless network during controller down time, mesh path cost metrics are adjusted to favor the current parent AP. An adjustment is made to the path cost calculation based on the adjusted metrics to encourage the mesh AP to maintain their current parent AP relationships. This adjustment does not completely disable the mesh APs from roaming if necessary. Loss of network connectivity during a prolonged controller down time can cause AP stranding or isolation while the controller is absent. Therefore, a mechanism is introduced to enable an RAP to detect a presence of a local switch/router through its root port and through which traffic associated with the RAP and descendent mesh APs may be routed to and from the wired network. If the router is not present, the mesh network dissolves to allow the network to form again thereafter.

In summary, in one form, a method is provided, comprising: at an access point (AP) in a wireless mesh network including a plurality of mesh APs and a root AP forming a root of a tree of the mesh APs in which the mesh APs are linked back to the root AP through parent-child relationships over wireless backhaul links, the root AP having a wired connection to a wired network, detecting a loss of connectivity from the AP to a controller of the mesh network through which traffic to and from the wireless mesh network is normally routed from and to the wired network, and in response to detecting the loss of connectivity: if the AP is the root AP, operating the root AP as a proxy controller through which traffic to and from the wireless mesh network is routed from and to the wired network; notifying each child AP of the loss of connectivity; and maintaining connectivity with parent and child APs over the wireless backhaul links that exist when the loss of connectivity is detected, so as to maintain the tree.

In another form, an apparatus is provided, comprising: one or more radios in an access point (AP) configured to communicate over backhaul links of a wireless mesh network including a plurality of mesh APs and a root AP forming a root of a tree of the mesh APs in which the mesh APs are linked back to the root AP through parent-child relationships over wireless backhaul links, the root AP having a wired connection to a wired network; and a processor coupled to the one or more radios, the processor configured to: detect a loss of connectivity to a controller of the mesh network through which traffic to and from the wireless mesh network is normally routed from and to the wired network, and in response to detecting the loss of connectivity: if the AP is the root AP, operate as a proxy controller through which traffic to and from the wireless mesh network is routed from and to the wired network; notify each child AP of the loss of connectivity; and maintain connectivity with parent and child APs over the wireless backhaul links that exist when the loss of connectivity is detected, so as to maintain the tree.

In still another form, a processor readable medium is provided for storing instructions that, when executed by a processor, cause the processor to: at an access point (AP) in a wireless mesh network including a plurality of mesh APs and a root AP forming a root of a tree of the mesh APs in which the mesh APs are linked back to the root AP through parent-child relationships over wireless backhaul links, the root AP having a wired connection to a wired network, detect a loss of connectivity from the AP to a controller of the mesh network through which traffic to and from the wireless mesh network is normally routed from and to the wired network, and in response to detecting the loss of connectivity: if the AP is the root AP, operate the root AP as a proxy controller through which traffic to and from the wireless mesh network is routed from and to the wired network; notify each child AP of the loss of connectivity; and maintain connectivity with parent and child APs over the wireless backhaul links that exist when the loss of connectivity is detected, so as to maintain the tree.

WLAN/VLAN Synchronization

The WLAN/VLAN Synchronization technique includes the following features. WLAN/VLAN mappings on a mesh AP propagate to the RAP through parent APs of the mesh AP. The RAP synchronizes the WLAN/VLAN mappings from all descendants (i.e., the RAP over-writes any descendent WLAN/VLAN mapping that does not match its own). This allows the mesh AP to continue to service WLANs. Traffic is properly routed to valid VLANs when the mesh AP roams to a different mesh network with a different WLAN/VLAN mapping. Because of the WLAN/VLAN synchronization/inheritance, wireless clients of the mesh AP can maintain their current association with the mesh AP after the mesh AP roams. Without a consistent mapping, wireless client traffic could not be forwarded to the correct VLAN on the wired network.

To achieve the foregoing, WLAN/VLAN mappings are stored both in RAPs and non-root descendant APs and are communicated between parent and children APs. Child APs follow the mappings provided by the RAP. Thus, WLAN traffic may switch within the wireless mesh network and reach VLANs configured on the local router/switch in the wired network.

Child APs can roam to any parent AP in a mesh "bridge group" that can span multiple IP subnets. Local WLAN/VLAN mappings/bindings are "pushed" out to a child AP when the child AP first roams to a new parent AP. When the child AP roams, the child AP originates a registration "request" including current WLAN/VLAN bindings. A registration reply, sent to the child AP from the new parent AP includes, possibly new, local WLAN/VLAN bindings.

Also, APs may add VLANs to Ethernet and radio VLAN trunk links as new VLANs are introduced by the above-described WLAN/VLAN registration protocol. The child AP uses the registration protocol to determine the set of VLANs that are "active" in the tree branch rooted at the RAP. The AP only "floods" layer 2 frames to nodes in its branch if the VLAN is active in the branch. (Note that a "VLAN" is a layer 2 broadcast domain.)

In summary, in one form, a method is provided, comprising: at a mesh access point (AP) in a wireless mesh network including a plurality of mesh APs and a root AP forming a root of a tree of the mesh APs in which the mesh APs are linked back to the root AP through parent-child relationships over wireless backhaul links, the root AP having a wired connection to a wired network and a controller through which traffic to and from the wireless mesh network is routed from and to the wired network, wherein the mesh AP is child AP to a current parent AP: providing access to the mesh network via wireless connections to wireless clients in one or more wireless local area network (WLANs) served by the mesh AP; storing current mappings between the one or more WLANs and one or more virtual local area networks (VLANs) configured on the wired network to which the WLANs are assigned; discovering a new parent AP; and roaming from the current parent AP to the new parent AP, wherein the roaming includes sending a registration request to the new parent AP to register as a child AP with the new parent AP, the registration request including all of the current WLAN/VLAN mappings stored in the mesh AP to be forwarded to the root AP by the new parent AP.

The method may further comprise, at the mesh AP: receiving a registration response from the new parent AP, the registration response including new WLAN/VLAN mappings for the mesh AP that were stored in and forwarded from the root AP down the tree to the parent AP; and replacing the current WLAN/VLAN mappings stored in the mesh AP with the new WLAN/VLAN mappings.

In another form, a method is provided, comprising: at a mesh access point (mesh AP) in a wireless mesh network including a plurality of mesh APs and a root AP (RAP) forming a root of a tree of the mesh APs in which the mesh APs are linked back to the RAP through parent-child relationships over wireless backhaul links, the RAP having a connection to a wired network: providing access to the mesh network via wireless connections to wireless clients in one or more wireless local area networks (WLANs) served by the mesh AP; storing mappings between the one or more WLANs served by the mesh AP and one or more virtual local area networks (VLANs) configured on the wired network and to which the WLANs are assigned; receiving, from a parent access point (AP) of the mesh AP, mappings between the VLANs configured on the wired network and WLANs served by the mesh AP as known by the RAP; and if the stored mappings and the received mappings differ, updating the stored mappings with the received mappings that differ from the stored mappings so that the stored mappings reflect the mappings known by the RAP.

In another form, an apparatus is provided, comprising: one or more radios in a mesh access point (AP) configured to communicate over backhaul links of a wireless mesh network including a plurality of mesh APs and a root AP forming a root of a tree of the mesh APs in which the mesh APs are linked back to the root AP through parent-child relationships over wireless backhaul links, the root AP having a wired connection to a wired network and a controller through which traffic to and from the wireless mesh network is routed from and to the wired network, wherein the AP is a child AP to a current parent AP; and a processor in the AP and coupled to the one or more radios, the processor configured to: provide access to the mesh network via wireless connections to wireless clients in one or more wireless local area network (WLANs) served by the AP; store current mappings between the one or more WLANs and one or more virtual local area networks (VLANs) configured on the wired network to which the WLANs are assigned; discover a new parent AP; and roam from the current parent AP to the new parent AP, wherein the processor is configured to send a registration request to the new parent AP to register as a child AP with the new parent AP, the registration request including all of the current WLAN/VLAN mappings stored in the AP to be forwarded to the root AP by the new parent AP.

In still another form, an apparatus is provided, comprising: one or more radios in a mesh access point (mesh AP) configured to communicate over backhaul links of a wireless mesh network including a plurality of mesh APs (mesh APs) and a root AP (RAP) forming a root of a tree of the mesh APs in which the mesh APs are linked back to the RAP through parent-child relationships over wireless backhaul links, the RAP having a connection to a wired network; and a processor coupled to the one or more radios, the processor configured to: provide access to the mesh network via wireless connections to wireless clients in one or more wireless local area networks (WLANs) served by the mesh AP; store mappings between the one or more WLANs served by the mesh AP and one or more virtual local area networks (VLANs) configured on the wired network and to which the WLANs are assigned; receive, from a parent access point (AP) of the mesh AP, mappings between the VLANs configured on the wired network and WLANs served by the mesh AP as known by the RAP; and if the stored mappings and the received mappings are different, update the stored mappings with the received mappings that are different from the stored mappings so that the stored mappings reflect the mappings known by the RAP.

In still another form, a processor readable medium is provided for storing instructions that, when executed by a processor, cause the processor to: at a mesh access point (AP) in a wireless mesh network including a plurality of mesh APs and a root AP forming a root of a tree of the mesh APs in which the mesh APs are linked back to the root AP through parent-child relationships over wireless backhaul links, the root AP having a wired connection to a wired network and a controller through which traffic to and from the wireless mesh network is routed from and to the wired network, wherein the mesh AP is child AP to a current parent AP: provide access to the mesh network via wireless connections to wireless clients in one or more wireless local area network (WLANs) served by the mesh AP; store current mappings between the one or more WLANs and one or more virtual local area networks (VLANs) configured on the wired network to which the WLANs are assigned; discover a new parent AP; and roam from the current parent AP to the new parent AP, wherein the roaming includes sending a registration request to the new parent AP to register as a child AP with the new parent AP, the registration request including all of the current WLAN/VLAN mappings stored in the mesh AP to be forwarded to the root AP by the new parent AP.

In still another form, a processor readable medium is provided for storing instructions that, when executed by a processor, cause the processor to: at a mesh access point (mesh AP) in a wireless mesh network including a plurality of mesh APs and a root AP (RAP) forming a root of a tree of the mesh APs in which the mesh APs are linked back to the RAP through parent-child relationships over wireless backhaul links, the RAP having a connection to a wired network: provide access to the mesh network via wireless connections to wireless clients in one or more wireless local area networks (WLANs) served by the mesh AP; store mappings between the one or more WLANs served by the mesh AP and one or more virtual local area networks (VLANs) configured on the wired network and to which the WLANs are assigned; receive, from a parent access point (AP) of the mesh AP, mappings between the VLANs configured on the wired network and WLANs served by the mesh AP as known by the RAP; and if the stored mappings and the received mappings are different, update the stored mappings with the received mappings that are different from the stored mappings so that the stored mappings reflect the mappings known by the RAP.

AP IP Subnet Roaming

The AP IP Subnet Roaming technique includes the following features. An ancestor AP advertises IP subnet information to a descendant (child) AP with a current parent AP. The child AP uses the advertised information to determine if a new parent AP is on the same subnet as, or a different subnet from, the current parent AP. The child AP re-initiates DHCP to obtain a new IP address when it roams to a new parent AP on a different IP subnet but does not re-initiate DHCP when it roams to a new parent AP on the same IP subnet. The child AP binds a session with a controller to a new IP address whenever it obtains a new IP address.

In summary, in one form, a method is provided, comprising: at a mesh access point (AP) in a wireless mesh network organized as a spanning tree of mesh APs linked back to one or more root APs through parent-child relationships over wireless backhaul links, the one or more root APs having respective wired connections to a wired network, the APs of the spanning tree being divided among multiple Internet Protocol (IP) subnets: roaming from a first parent AP of the mesh AP to a second parent AP of the mesh AP; determining if the first and second parent APs are both members of a first IP subnet of the multiple IP subnets; and if it is determined that the existing and new parent APs are members of the first IP subnet indicating that the mesh AP has roamed within the first IP subnet: maintaining connectivity with a first controller through which traffic to and from the first IP subnet is routed from and to the wired network; and maintaining a first IP address assigned to the mesh AP in the first IP subnet.

The method may further comprise, at the mesh AP: if it is determined that the first and second parent APs are members of different IP subnets indicating that the mesh AP has roamed from the first IP subnet to a second IP subnet of the multiple IP subnets: obtaining a second IP address for use in the second IP subnet; dropping connectivity with the first controller; and establishing connectivity with one of the first controller and a second controller through which traffic to and from the second IP subnet is routed from and to the wired network.

In another form, an apparatus is provided, comprising: one or more radios in a mesh access point (AP) configured to communicate over backhaul links in a wireless mesh network organized as a spanning tree of mesh APs linked back to one or more root APs through parent-child relationships over wireless backhaul links, the one or more root APs having respective wired connections to a wired network, the APs of the spanning tree being divided among multiple Internet Protocol (IP) subnets; and a processor in the AP and coupled to the one or more radios, the processor configured to: roam from a first parent AP of the mesh AP to a second parent AP of the mesh AP; determine if the first and second parent APs are both members of a first IP subnet of the multiple IP subnets; and if it is determined that the existing and new parent APs are members of the first IP subnet indicating that the mesh AP has roamed within the first IP subnet: maintain connectivity with a first controller through which traffic to and from the first IP subnet is routed from and to the wired network; and maintain a first IP address assigned to the mesh AP in the first IP subnet.

In still another form, a processor readable medium is provided for storing instructions that, when executed by a processor, cause the processor to: at a mesh access point (AP) in a wireless mesh network organized as a spanning tree of mesh APs linked back to one or more root APs through parent-child relationships over wireless backhaul links, the one or more root APs having respective wired connections to a wired network, the APs of the spanning tree being divided among multiple Internet Protocol (IP) subnets: roam from a first parent AP of the mesh AP to a second parent AP of the mesh AP; determine if the first and second parent APs are both members of a first IP subnet of the multiple IP subnets; and if it is determined that the existing and new parent APs are members of the first IP subnet indicating that the mesh AP has roamed within the first IP subnet: maintain connectivity with a first controller through which traffic to and from the first IP subnet is routed from and to the wired network; and maintain a first IP address assigned to the mesh AP in the first IP subnet.

The processor readable medium may further comprise instructions to cause the processor to: if it is determined that the first and second parent APs are members of different IP subnets indicating that the mesh AP has roamed from the first IP subnet to a second IP subnet of the multiple IP subnets: obtain a second IP address for use in the second IP subnet; drop connectivity with the first controller; and establish connectivity with one of the first controller and a second controller through which traffic to and from the second IP subnet is routed from and to the wired network.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a mesh access point (AP) in a wireless mesh network including a plurality of mesh access points and a root AP forming a root of a tree of the mesh APs in which the mesh APs are linked back to the root AP through parent-child relationships over wireless backhaul links, the root AP having a connection to a wired network:
   providing access to the mesh network via wireless connections to wireless clients in one or more wireless local area networks (WLANs) served by the mesh AP;
   storing mappings between the one or more WLANs served by the mesh AP and one or more virtual local area networks (VLANs) configured on the wired network and to which the WLANs are assigned;
   receiving, from a parent access point of the mesh AP, mappings between the VLANs configured on the wired network and WLANs served by the mesh AP as known by the root AP; and
   if the stored mappings and the received mappings differ, updating the stored mappings with the received mappings that differ from the stored mappings so that the stored mappings reflect the mappings known by the root AP.

2. The method of claim 1, further comprising, at the mesh AP:
   receiving, from a child AP of the mesh AP, mappings between one or more WLANs served by the child AP and one or more of the VLANs; and
   sending the mappings received from the child AP to the parent AP to be forwarded to the root AP.

3. The method of claim 2, wherein, from the perspective of the root AP, the mappings between the one or more WLANs served by the mesh AP and the one or more VLANs configured on the wired network include the mappings between the one or more WLANs served by the child AP and the VLANs configured on the wired network.

4. The method of claim 1, further comprising, at the mesh AP:
   discovering a new parent AP to which to roam;
   sending to the new parent AP a registration request destined for the root AP, the registration request configured to register the mesh AP as a child AP to the new parent AP and including the stored mappings;

in response to sending the registration request, receiving from the parent AP a registration response originated at the root AP and that includes the mappings as known to the root AP; and if the stored mappings and the mappings in the received registration response are different, performing the updating.

5. The method of claim 1, wherein the mappings between the one or more WLANs served by the mesh AP and the one or more virtual local area networks (VLANs) configured on the wired network include a mesh AP identifier and a mesh AP media access control (MAC) address that are each mapped to a list of the one or more WLANs, which are in turn mapped to the one or more VLANs.

6. The method of claim 1, further comprising, at the mesh AP:

while the mesh AP is connected to a controller of the mesh network through which traffic to and from the wireless mesh network is normally routed from and to the wired network, advertising to each child AP of the mesh AP a respective actual path-cost leading back to the root AP; and detecting a loss of connectivity to the controller and, in response thereto, advertising to each child AP an artificially reduced path-cost that is less than the respective actual path cost so as to inhibit each child AP from roaming to a different parent AP during the loss of connectivity.

7. The method of claim 6, further comprising, at the mesh AP, if connectivity with the controller is detected, advertising to each child AP the respective actual path-cost.

8. The method of claim 1, further comprising, at the root AP:

storing in the root AP mappings of one or more WLANs to one or more VLANs configured on the wired network for each of the root AP and all descendent mesh APs of the root AP; and updating the mappings stored in the root AP for each of the root AP and all descendent mesh APs of the root AP based on changes to the VLANs configured on the wired network.

9. The method of claim 8, further comprising, at the root AP:

sending the mappings stored in the root AP to all of the descendent mesh APs of the root AP;

receiving respective mappings from each of the descendent mesh APs of the root AP; and updating the mappings stored in the root AP for each of the descendent mesh APs based on the respective mappings from all of the descendent mesh APs.

10. An apparatus comprising:

one or more radios in a mesh access point (AP) configured to communicate over backhaul links of a wireless mesh network including a plurality of mesh APs and a root AP forming a root of a tree of the mesh APs in which the mesh APs are linked back to the root AP through parent-child relationships over wireless backhaul links, the root AP having a connection to a wired network;

a memory; and a processor coupled to the one or more radios and the memory, the processor configured to:

provide access to the mesh network via wireless connections to wireless clients in one or more wireless local area networks (WLANs) served by the mesh AP;

store mappings between the one or more WLANs served by the mesh AP and one or more virtual local area networks (VLANs) configured on the wired network and to which the WLANs are assigned;

receive, from a parent access point of the mesh AP, mappings between the VLANs configured on the wired network and WLANs served by the mesh AP as known by the root AP; and if the stored mappings and the received mappings are different, update the stored mappings with the received mappings that are different from the stored mappings so that the stored mappings reflect the mappings known by the root AP.

11. The apparatus of claim 10, wherein the processor is further configured to:

receive, from a child AP of the mesh AP, mappings between one or more WLANs served by the child AP and one or more of the VLANs; and send the mappings received from the child AP to the parent AP to be forwarded to the root AP.

12. The apparatus of claim 10, wherein the processor is further configured to:

discover a new parent AP to which to roam;

send to the new parent AP a registration request destined for the root AP, the registration request configured to register the mesh AP as a child AP to the new parent AP and including the stored mappings;

in response to sending the registration request, receive from the parent AP a registration response originated at the root AP and that includes the mappings as known to the root AP; and if the stored mappings and the mappings in the received registration response are different, perform the update operation.

13. The apparatus of claim 10, wherein the mappings between the one or more WLANs served by the mesh AP and the one or more virtual local area networks (VLANs) configured on the wired network include a mesh AP identifier and a mesh AP media access control (MAC) address that are each mapped to a list of the one or more WLANs, which are in turn mapped to the one or more VLANs.

14. The apparatus of claim 10, wherein the processor is further configured to:

while the mesh AP is connected to a controller of the mesh network through which traffic to and from the wireless mesh network is normally routed from and to the wired network, advertise to each child AP of the mesh AP a respective actual path-cost leading back to the root AP; and detect a loss of connectivity to the controller and, in response thereto, advertise to each child AP an artificially reduced path-cost that is less than the respective actual path cost so as to inhibit each child AP from roaming to a different parent AP during the loss of connectivity.

15. The apparatus of claim 14, wherein the processor is further configured to, if connectivity with the controller is detected, advertise to each child AP the actual path-cost.

16. A non-transitory tangible processor readable medium storing instructions that, when executed by a processor, cause the processor to, at a mesh access point (AP) in a wireless mesh network including a plurality of mesh APs and a root AP forming a root of a tree of the mesh APs in which the mesh APs are linked back to the root AP through parent-child relationships over wireless backhaul links, the root AP having a connection to a wired network:

provide access to the mesh network via wireless connections to wireless clients in one or more wireless local area networks (WLANs) served by the mesh AP;

store mappings between the one or more WLANs served by the mesh AP and one or more virtual local area networks (VLANs) configured on the wired network and to which the WLANs are assigned;

receive, from a parent access point of the mesh AP, mappings between the VLANs configured on the wired network and WLANs served by the mesh AP as known by the root AP; and if the stored mappings and the received mappings are different, update the stored mappings with the received mappings that are different from the stored mappings so that the stored mappings reflect the mappings known by the root AP.

17. The non-transitory processor readable medium of claim 16, further comprising instructions to cause the processor to:

receive, from a child AP of the mesh AP, mappings between one or more WLANs served by the child AP and one or more of the VLANs; and send the mappings received from the child AP to the parent AP to be forwarded to the root AP.

18. The non-transitory processor readable medium of claim 16, further comprising instructions to cause the processor to:

discover a new parent AP to which to roam;

send to the new parent AP a registration request destined for the root AP, the registration request configured to register the mesh AP as a child AP to the new parent AP and including the stored mappings;

in response to sending the registration request, receive from the parent AP a registration response originated at the root AP and that includes the mappings as known to the root AP; and if the stored mappings and the mappings in the received registration response are different, perform the update operation.

19. The non-transitory processor readable medium of claim 16, wherein the mappings between the one or more WLANs served by the mesh AP and the one or more virtual local area networks (VLANs) configured on the wired network include a mesh AP identifier and a mesh AP media access control (MAC) address that are each mapped to a list of the one or more WLANs, which are in turn mapped to the one or more VLANs.

20. The non-transitory processor readable medium of claim 16, further comprising instructions to cause the processor to:

while the mesh AP is connected to a controller of the mesh network through which traffic to and from the wireless mesh network is normally routed from and to the wired network, advertise to each child AP of the mesh AP a respective actual path-cost leading back to the root AP; and detect a loss of connectivity to the controller and, in response thereto, advertise to each child AP an artificially reduced path-cost that is less than the respective actual path cost so as to inhibit each child AP from roaming to a different parent AP during the loss of connectivity.

* * * * *